United States Patent
Martin et al.

(10) Patent No.: US 11,162,890 B2
(45) Date of Patent: *Nov. 2, 2021

(54) HOUSING APPARATUS FOR SENSITIVE GAS SENSOR

(71) Applicant: International Business Machines Corporation, Armonk, NY (US)

(72) Inventors: Yves Martin, Ossining, NY (US); William Green, Irvington, NY (US); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/732,511

(22) Filed: Jan. 2, 2020

(65) Prior Publication Data

US 2020/0209148 A1 Jul. 2, 2020

Related U.S. Application Data

(63) Continuation of application No. 16/238,071, filed on Jan. 2, 2019, now Pat. No. 10,613,023.

(51) Int. Cl.
*G01N 21/17* (2006.01)
*G01N 21/39* (2006.01)

(52) U.S. Cl.
CPC ......... *G01N 21/1717* (2013.01); *G01N 21/39* (2013.01); *G01N 2021/1731* (2013.01)

(58) Field of Classification Search
CPC ...... G01N 27/26; G01N 27/407; G01N 33/00; G01N 29/24; G01N 29/2418; G01N 2021/1731; G01N 21/1717; G01N 21/39
See application file for complete search history.

(56) References Cited

U.S. PATENT DOCUMENTS

| | | | |
|---|---|---|---|
| 10,466,174 B2 | 11/2019 | Glacer et al. | |
| 10,613,023 B1* | 4/2020 | Martin | G01N 21/39 |
| 2002/0195339 A1 | 12/2002 | Nakamura et al. | |
| 2008/0223110 A1 | 9/2008 | Weyl et al. | |
| 2010/0200427 A1 | 8/2010 | Koike et al. | |
| 2015/0101395 A1 | 4/2015 | Dehe et al. | |

OTHER PUBLICATIONS

List of IBM Patents or Patent Applications Treated as Related.

* cited by examiner

*Primary Examiner* — Abdullahi Nur
(74) *Attorney, Agent, or Firm* — L. Jeffrey Kelly; Ryan, Mason & Lewis, LLP (57) ABSTRACT

A sensor housing apparatus includes a housing having an enclosure and outer assembly, at least one flow path extending through the housing, a gas sensor disposed in the enclosure and a thermal mass. The thermal mass is mounted within the enclosure in thermal communication with the gas sensor, and is configured to transfer thermal energy from the gas sensor to an ambient environment surrounding the housing and minimize temperature gradients adjacent the gas sensor.

20 Claims, 11 Drawing Sheets

HOUSING APPARATUS FOR SENSITIVE GAS SENSOR

STATEMENT REGARDING FEDERALLY SPONSORED RESEARCH OR DEVELOPMENT

This invention was made with Government support under Contract Number DE-AR0000540 awarded by the Department of Energy. The government has certain rights to this invention.

BACKGROUND

The present invention generally relates to gas sensors, and more particularly, relates to a sensor housing apparatus exhibiting excellent thermal conduction properties for maintaining the gas sensor within a desired temperature operating range while minimizing the temperature gradients at the gas sensor when exposed to fluctuations in ambient temperature.

Gas sensors are utilized for various applications including in industrial plants, the automobile industry, health facilities, mines, commercial buildings, residences, etc. to detect gases, e.g., fugitive gases, which may be flammable, explosive, and/or toxic. In an outdoors application, gas sensors are typically incorporated within a housing assembly, which provides some degree of protection for the gas sensor from the ambient environment. However, the gas sensing capabilities of conventional outdoor housing assemblies are often compromised due to inadequate dissipation of heat at the gas sensor, changes in ambient temperature and exposure to other environmental conditions.

SUMMARY

Embodiments of the present invention provide a sensor housing apparatus and a methodology for detecting gas where the housing functions to maintain the gas sensor at optimal temperature levels while minimizing temperature gradients at the gas sensor.

In one embodiment, a sensor housing apparatus includes a housing having an enclosure and an outer assembly. The enclosure includes first and second coaxially arranged shells with the first shell defining an opening therethrough. The outer assembly includes at least one outer shell disposed in spaced relation to the first shell of the enclosure. A flow path is defined between the first shell of the enclosure and the outer shell of the outer assembly to permit passage of air, and is in fluid communication with the opening in the first shell of the enclosure. A filter membrane is positioned adjacent the opening in the first shell of the enclosure. A gas sensor is disposed in the enclosure in alignment with the opening, and is configured to detect a presence of gas in the air passing along the at least one flow path, through the filter membrane and entering the opening in the first shell. A thermal mass is mounted within the enclosure in thermal communication with the gas sensor. The thermal mass is configured to transfer thermal energy from the gas sensor to an ambient environment surrounding the housing and to minimize temperature gradients adjacent the gas sensor.

In another embodiment, a sensor housing apparatus includes an enclosure having first and second shells with the first shell defining an opening therethrough, an outer assembly including a lower outer shell and an upper outer shell, a first flow path defined between the lower outer shell of the outer assembly and the first shell of the enclosure, and being in fluid communication with the opening in the first shell of the enclosure, a second flow path defined between the upper outer shell of the outer assembly and the second shell of the enclosure, a filter membrane positioned adjacent the opening in the first shell of the enclosure, an optical gas sensor disposed in the enclosure in alignment with the opening, and configured to detect a presence of gas in the air passing from the at least one flow path and through the opening in the first shell, and a thermal mass mounted within the enclosure in thermal communication with the gas sensor. The thermal mass is configured to establish an overall thermal resistance $R_T$ with an ambient environment less than 30° C./W and a thermal time constant $\tau$ greater than 100 seconds.

In another embodiment, a method for detecting gas includes assembling an enclosure having first and second shells defining an enclosed interior therebetween, positioning a gas sensor within the enclosure adjacent an opening in the first shell, mounting a thermal mass within the enclosed interior of the enclosure, detecting, with the gas sensor, gas in an air flow path in communication with the opening in the first shell of the enclosure, and transferring thermal energy from the gas sensor to the thermal mass to maintain the gas sensor within an operable temperature range and/or minimize temperature gradients at the gas sensor.

Other features of the present invention will be better appreciated from the following description.

DETAILED DESCRIPTION

Illustrative embodiments will be described hereinbelow of a sensor housing apparatus for detecting gases, particularly, flammable or toxic fugitive trace gases such as methane, propane, carbon monoxide, mercury, ethylene oxide, volatile organic compounds, hydrogen sulphide, etc. The sensor housing apparatus is operable in an outdoor environment and is structured to withstand severe weather conditions including wind, rain, solar heat, etc. According to some embodiments of the present invention, the sensor housing apparatus provides a high degree of immunity from ambient temperature variations, enhanced thermal conduction between the gas sensor and the ambient environment to maintain the gas sensor at relatively low operating levels, and quick or fast-acting detection of trace or fugitive gases. In certain embodiments, the sensor housing apparatus also minimizes the temperature gradients at, or across, the gas sensor, which would otherwise have a detrimental effect on the functioning of the sensor. The sensor housing apparatus incorporates a thermal mass specifically designed to function, in one respect, as a heat mass (or a thermal mass or a thermal capacitor) for the gas sensor and, in a second respect, as a thermal resistor to outside ambient temperature. A sufficiently low thermal resistor is significant for effective cooling of the sensor, while a large heat mass is significant to minimizing temperature fluctuations at the sensor. The sensor housing apparatus provides at least one or more fluid flow paths which are aerodynamically designed to direct the flow of air toward the gas sensor to facilitate rapid detection of fugitive gases.

Figure 1:
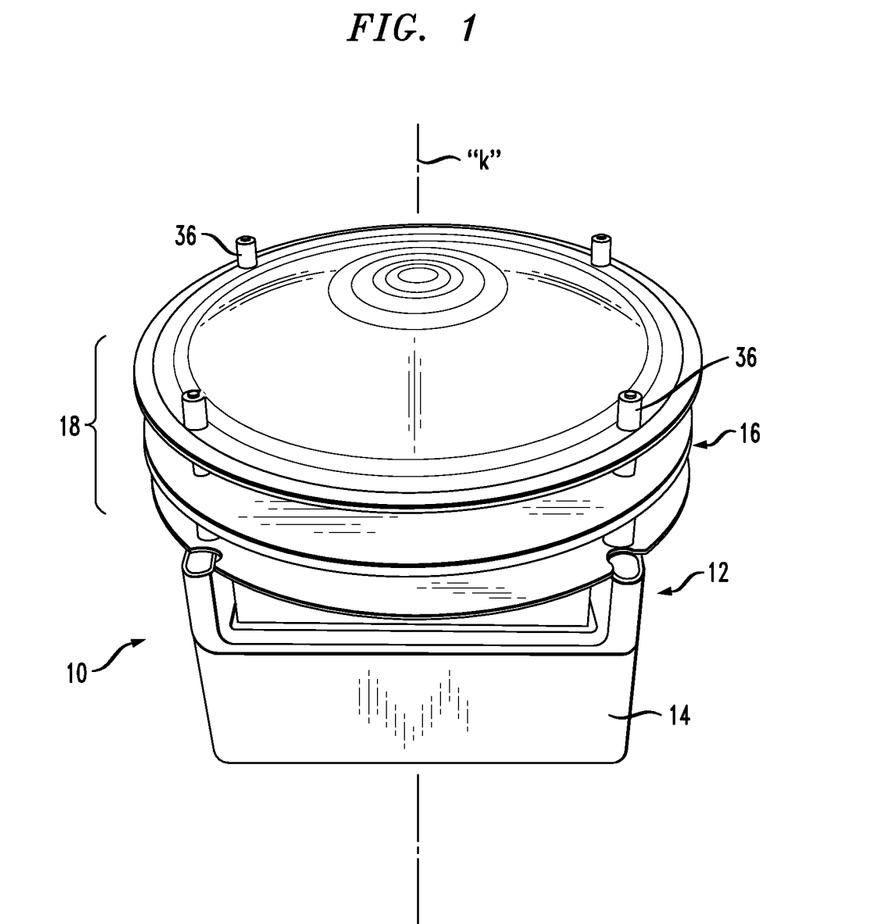
FIG. 1 is a perspective view of an exemplary sensor housing apparatus for detecting gas according to one or more embodiments of the present invention.
Figure 2:
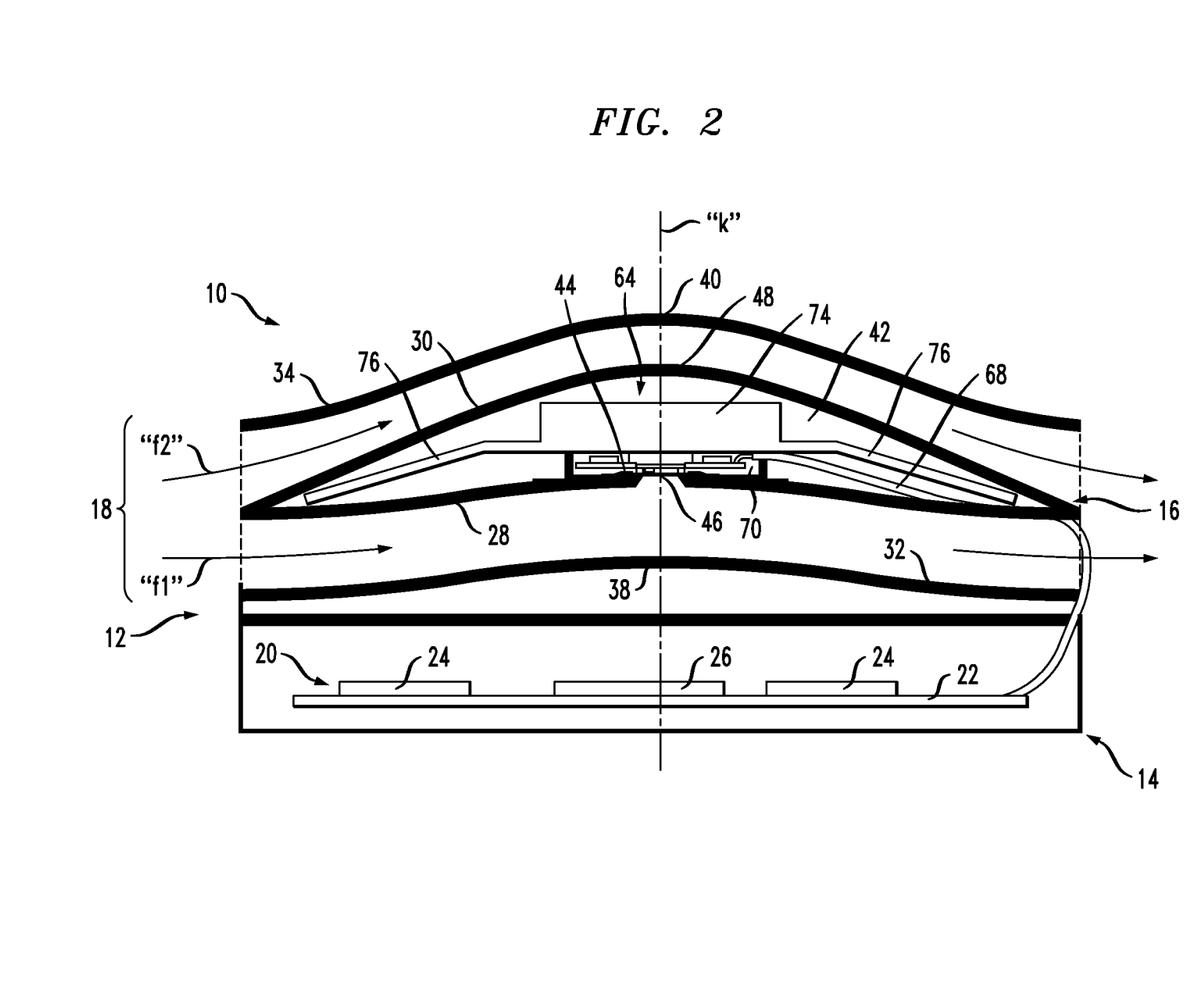
FIG. 2 is a schematic view of the exemplary sensor housing apparatus illustrating the base, the outer assembly and the enclosure according to one or more embodiments of the present invention.

Referring now to FIGS. 1-2, there is illustrated a sensor housing apparatus 10 in accordance with an exemplary embodiment of the present invention. The sensor housing apparatus 10 may be disposed for operation in an external environment, e.g., at locations adjacent an industrial site, a hospital, residential sites or, alternatively, may be disposed indoors. In one exemplary application, the sensor housing apparatus is intended for outdoor use to detect the presence of fugitive gas, e.g., methane gas.

The sensor housing apparatus 10 includes a housing 12 defining a central longitudinal axis "k". The housing 12 includes several components, namely a base 14, an enclosure 16 and an outer assembly 18 at least partially surrounding the enclosure 16. The base 14 houses various electronics utilized to operate the apparatus 10 including, but not limited to, gas sensor controlling circuitry, generally identified as reference numeral 20 (FIG. 2). The base 14 is dimensioned for positioning directly on land, a cement footing, decking or the like, and may be rectangular in configuration although other shapes are also envisioned. The base 14 may be formed of stainless steel, aluminum or a suitable polymeric material. The gas sensor controller circuitry 20 includes a printed circuit board (PCB) 22, at least one electronic component 24 (e.g., two are shown), and optionally a power source 26.

The enclosure 16 of the housing 12 includes first and second shells 28, 30 coaxially mounted about the central longitudinal axis "k." The outer assembly 18 of the housing 12 includes a lower shell 32 adjacent the base 12 and an upper shell 34 displaced from the base 14. The lower and upper shells 32, 34 are also coaxially arranged about the central longitudinal axis "k". The enclosure 16 and the outer assembly 18 are supported by peripheral mounting posts 36 extending from the base 14 to the upper shell 34 of the outer assembly 18. (FIG. 1) Four mounting posts 36 are shown although more or less than four mounting post 36 may be provided.

As best depicted in FIG. 2, the lower shell 32 of the outer assembly 18 is generally dome shaped defining a slight curvature with a centrally disposed apex 38 in general alignment with the central longitudinal axis "k". Similarly, the upper shell 34 of the outer assembly 18 is also dome shaped defining a curvature greater than that of the lower shell 32 with its apex 40 also being centrally disposed with respect to the central longitudinal axis "k". The upper shell 34 protects the housing apparatus 10 from sun, heat and rain, and may serve as a platform for a solar panel utilized for powering the housing apparatus 10. For example, the solar panel may supply power to the power source 26 in the base 14. The dome shape of the upper shell 34 also minimizes collection of rain water or snow on the upper shell 34.

The first and second shells 28, 30 of the enclosure 16 are coupled, sealed or connected along their peripheries to define an enclosed interior 42 confined within the first and second shells 28, 30. The first shell 28 is dome shaped defining a curvature generally approximating the curvature of the lower shell 32. At the apex 44 of the first shell is an opening 46 in general alignment with the central longitudinal axis "k" of the housing 12. The second shell 30 is also dome shaped having a curvature generally approximating the curvature of the upper shell 34, and defining an apex 48 in alignment with the central longitudinal axis "k." The first shell 28 and the lower shell 32 define therebetween a slightly arcuate first flow path "f1" through the housing 12, and the second shell 30 and the upper shell 34 define a slightly arcuate second flow path "f2" through the housing 12. The first and second flow paths "f1", "f2" are aerodynamically arranged to promote ease of air movement and rapid flow through the housing 12 permitting access to fresh volumes of air with trace amounts of fugitive gas to be sensed or detected. The arcuate arrangement of the first shell 28 and the lower shell 32 will direct the air toward the opening 46 in the first shell 28 for gas detection as will be discussed hereinbelow. In addition, the flow paths "f1", "f2" minimize the effect of wind velocity on the gas sensing capabilities of the apparatus 10.

Figure 3:
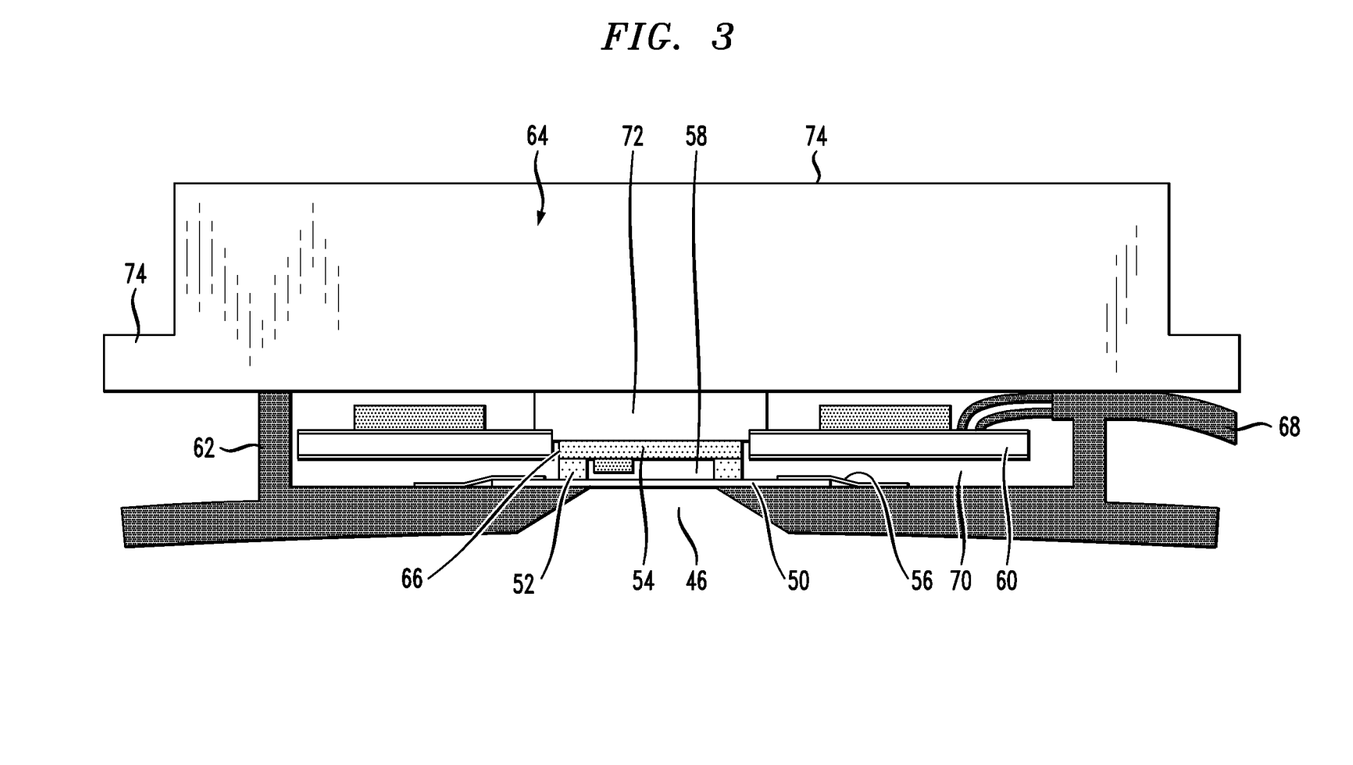
FIG. 3 is a schematic view illustrating the thermal mass, gas sensor and filter membrane of the enclosure according to one or more embodiments of the present invention.

With reference to FIGS. 2-3, the enclosure 16 contains a filter membrane 50 which is positioned over the opening 46 in the first shell 28, a spacer 52 disposed adjacent the filter membrane 50 and a gas sensor 54 mounted, or coupled, to the spacer 52. The filter membrane 50 may be secured relative to the first shell 28 with an adhesive layer 56 or the like. The filter membrane 50 may be multilayered with micron sized holes to facilitate rapid diffusion of air flowing through the first flow path "f1" to communicate with the gas sensor 54. The filter membrane 50 may have thermal resistance characteristics to assist in reducing transfer of thermal energy from the ambient air to the gas sensor 54. The spacer 52 may be generally annular in configuration, e.g., a gasket, and is positioned to surround the opening 46 in the first shell 28.

The filter membrane 50 and the spacer 52 define a gas sensing volume or space 58 which is in fluid communication with the gas sensor 54. The gas sensor volume 58 defines a relatively small height measured from the filter membrane 50 to the surface of the gas sensor 54, which may be 2 millimeters (mm) or less. The spacer 52 may be formed from an elastomer having a low thermal conductivity selected to minimize transfer of thermal energy from the ambient air flow to the gas sensor 54. One suitable material is Viton® which is well suited to withstand high temperature while simultaneously retaining its mechanical properties. The filter membrane 50, the spacer 52 and the gas sensing space or volume 58 possess or exhibit a thermal resistance that acts as a spurious short-circuit thermal resistor between the gas sensor 54 and the ambient environment.

The gas sensor 54 may be any suitable highly sensitive sensor capable of detecting trace amounts of gas, e.g., methane gas. In an embodiment, the gas sensor 54 is an optical gas sensor having a sensing chip with a sensing surface. One suitable optical gas sensor 54 is a silicon photonic sensor. The gas sensor 54 is positioned within the gas sensing volume 58 in close proximity to the filter membrane 50 to communicate with air diffusing through the filter membrane 50 and through the opening 46 in the first shell 28. This positioning of the gas sensor 54 provides for a highly sensitive and rapid detection of fugitive trace gases flowing along the first fluid path "f1".

With continued reference to FIGS. 2-3, the enclosure 16 further includes a printed circuit board 60 electrically coupled to the gas sensor 54, an at least partial annular wall 62 depending upwardly from the first shell 28 and a thermal mass 64 supported by the wall 62. The printed circuit board 60 incorporates various electronic components to support the gas sensor 54 and may include a sensor amplifier. The printed circuit board 60 may include a central opening 66 for accommodating the gas sensor 54. An electric cable 68 is coupled to the printed circuit board 60 and to the gas sensing circuitry 20 within the base 14 to control and monitor operation of the gas sensor 54. Alternatively, wireless communication between the components is also envisioned. The annular wall 62 defines an internal enclosure 70 which houses the gas sensor 54, the printed circuit board 60 and the sensor amplifier.

The thermal mass 64 is thermally coupled to the gas sensor 54. In embodiments, a heat pedestal 72 extends from the gas sensor 54 to the thermal mass 64 to effect the thermal coupling, and may be in contacting relation with the gas sensor 54. The heat pedestal 72 may or may not be a component of the thermal mass 64. The thermal mass 64 includes a main heat segment 74 centered around the gas sensor 54 and opposing wings 76 depending outwardly from the main heat segment 74. The wings 76 may extend close or adjacent to the periphery of the enclosure 16, and may have a bend or curvature to follow the contour of the enclosure 16.

The thermal mass 64 is configured to serve as both a heat sink to remove heat from the gas sensor 54 and as a heat capacitor to thermally isolate the gas sensor 54 from the ambient environment. With regards to its thermal isolation functionality, the thermal mass 64 provides a thermal resistance with the ambient environment sufficient to minimize effects of outside temperature changes and temperature gradients at the gas sensor 54. The thermal mass 64 and the heat pedestal 72 may be formed of aluminum, copper or any other suitable conducting material including conductive graphite.

In embodiments, the thermal mass 64 is specifically designed to achieve a thermal resistance RT of the housing 12 less than 30° C./W (where C=temperature in degrees and W=watts), a thermal time constant τ (tau) greater than 100 seconds, and to produce relatively low temperature gradients adjacent the gas sensor 54 during use of the apparatus 10 in detecting gas. The thermal mass 64 is also configured to achieve a temperature differential, referred to as ΔT, between the sensor 54 and the ambient environment on a scale of about 1° C. to about 10° C. when the power dissipated by the sensor 54 is on the order of 1 watt.

The thermal resistance $R_T$ of the housing 12 of the gas sensor apparatus 10 compensates for effective cooling of the gas sensor 54 while also minimizing the temperature gradients at the gas sensor 54. In general, if the thermal resistance $R_T$ is too high, there will be an increased immunity to the effects of outside temperature changes of the gas sensor 54, but the gas sensor 54 will be operating at too warm of a temperature level. If the thermal resistance $R_T$ is too low, the gas sensor 54 will be sufficiently cool but the temperature gradients at the gas sensor 54 will be increased. Increased temperature gradients across the sensor 54 will negatively impact the performance of the gas sensor 54. Thus, one objective of the present invention is to identify an appropriate thermal resistance $R_T$ which addresses both of these issues.

Figure 4:
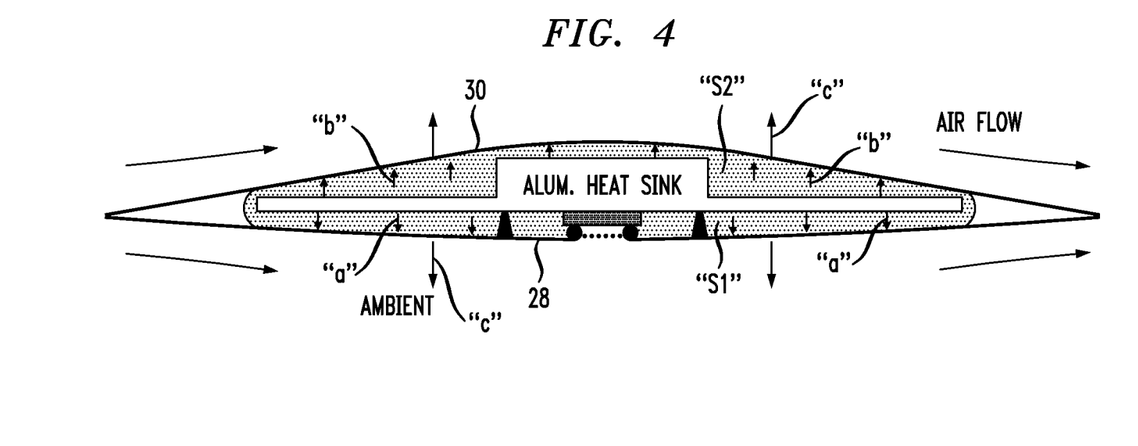
FIG. 4 is a schematic view illustrating a methodology for calculating the overall thermal resistance $R_T$ of the sensor housing apparatus and for measuring temperature gradients at the gas sensor according to one or more embodiments of the present invention.

FIG. 4 is a schematic of one exemplary embodiment where the thermal resistance $R_T$ of the housing 12 of the sensor housing apparatus 10 is optimized to achieve the objectives of adequately cooling the gas sensor 54 while minimizing temperature gradients across the gas sensor 54. A major contributor to the thermal resistance $R_T$ of the sensor housing apparatus 10 is the passage of heat or thermal energy within the air of the enclosure 16, specifically, the passage of air between the first shell 28 and the thermal mass 64 (identified as arrows "a"), the passage of air between the second shell 30 and the thermal mass 64 (identified as arrows "b"), and the passage of air along the surface of the thermal mass 64. To obtain the thermal resistance $R_T$ within the enclosure, the volume of air between the first shell 28 and the thermal mass 64 is viewed as a first air slab "s1" and the volume of the air between the second shell 30 and the thermal mass 64 is viewed as a second air slab "s2." In the embodiment, the total area "A" of the air slabs "S1", "S2", i.e., the air enclosed within the enclosure, is 240 cm², and the average thickness "t" is 0.5 cm. Thus, the total thermal resistance $R_A$ of the air slabs "S1", "S2" is calculated as follows:

$$R_A(\text{inside air}) = t/kA$$

where k is the thermal conductivity of air, k=0.024 W/m/° C.

$$R_A(\text{inside air}) = 0.5 \text{ cm}/(0.024 \text{ W/m/° C.}(240 \text{ cm}^2) = 9° \text{ C./W}$$

Also contributing to the total thermal resistance $R_T$ is the conduction of air from the enclosure 16 through the first and second shells 26, 28 (arrows "c"), which is approximately 1° C./W. Thus, the total thermal resistance $R_T$ of the housing 12 is approximately 10° C./W. It is noted that the lower and upper shells 32, 34 of the outer assembly 18 produce negligible thermal resistance effects. In particular, the outer assembly 18 produces an additional resistance. However, during most of the operational life of the gas sensor 54, small wind currents carry heat away from the shells 28, 30 of the outer enclosure 16 in a very efficient manner. Under these conditions, the additional thermal resistance becomes negligible.

Continuing with the example, knowing that the thermal resistance $R_T$ of the housing 12 is 10° C./W, ΔT (the temperature difference between the sensor 54 and the ambient environment) can be calculated as follows:

$$\Delta T = PR_T$$

where P is the dissipated power of the gas sensor 54, which for the selected embodiment is 0.5 W $$\Delta T = 0.5 \text{ W}(10° \text{ C./W}) = 5°$$

Many commercial sensors including the optical gas sensor 54 are designed to operate within temperatures ranging between about −40° C. to about +80° C. Since extreme outdoor temperatures are typically between about −40° C. and about +45° C., our enclosure provides adequate cooling to sensors for operation in all practical outdoor conditions. The thermal time constant τ is calculated as follows:

$$\tau = R_T C_H$$

where $C_H$ is the heat capacity of the thermal mass, which in the example is based on a thermal mass fabricated from aluminum, where aluminum has a heat capacity of 0.9 J/g/° C. and where the weight of the thermal mass is 100 g $$C_H = 100 \text{ g}(0.9 \text{ J/g/° C.}) = 90 \text{ J/° C.}$$

$$\tau = 10° \text{ C./W}(90 \text{ J/° C.}) = 900 \text{ secs}$$

The practical significance can be seen in the following way: when the outdoor temperature changes from its current value to a new value, it takes on the order of 900 seconds for the optical gas sensor 54 to equilibrate to the new temperature, i.e., the temperature of the optical gas sensor 54 changes with a rate dictated by the time constant. Measurements conducted on a turbulent day (FIG. 6) confirm that maximum changes in sensor temperature are on the order of 0.003° C./s (or 3 degrees in 900 seconds).

Figure 5:
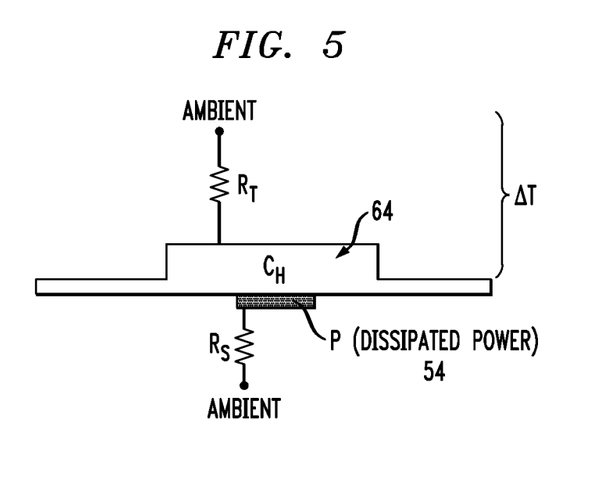
FIG. 5 is an illustration of the flow of thermal energy within the sensor housing apparatus represented as an electrical circuit according to one or more embodiments of the present invention.

FIG. 5 is an illustration of the flow of thermal energy within the sensor housing apparatus 10 represented as an electrical circuit. As discussed hereinabove, the shunt thermal resistance Rs of the spacer 52, the filter membrane 50, and the gas sensing space or volume 58 is greater than 200° C./W, taking into account the use of the spacer 52 in the form of an O-ring fabricated from Viton® having a thermal conductivity of 0.1 W/m/° C., a 15 mm diameter and 1 mm thickness. By making Rs substantially greater than $R_T$ (e.g., Rs>5 $R_T$ in one exemplary embodiment and in other embodiments Rs>20 $R_T$), the bypass of thermal energy and associated thermal variations from the ambient to the gas sensor 54 is minimized, that would otherwise negatively impact the gas sensor 54.

Figure 6:
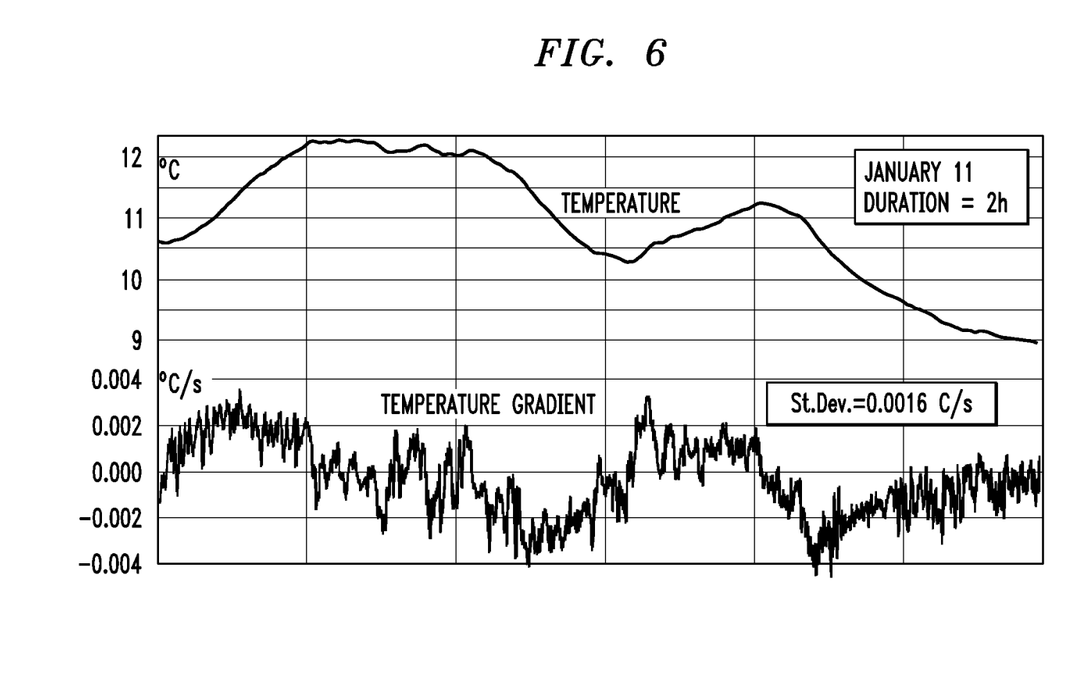
FIG. 6 is an exemplary graph illustrating the temperature of the gas sensor and the temperature gradients at the gas sensor measured as a function of time according to one or more embodiments of the present invention.

FIG. 6 is an exemplary graph depicting the temperature of the gas sensor 54 and the temperature gradients across the gas sensor 54 of the gas sensory apparatus 10 built in accordance with the parameters and features discussed in the above example. These measurements were taken over a two-hour period. As you can see and mentioned hereinabove, the temperature gradients adjacent the optical gas sensor 54 never exceed an absolute value greater than 0.004° C./s and are typically around 0.003° C./s (or 3° in 900 seconds). This is significant in that conventional optical gas sensors 54 are highly sensitive to temperature changes, and potentially may produce false positive and negative measurements as a result of high temperature gradients. The low temperature gradients across the optical gas sensor 54 resulting from the overall design of the housing 12 significantly enhances the performance of the optical gas sensor 54 in detecting fugitive gases.

In use, air flows through the first and second flow paths "f1", "f2" of the housing 12 facilitated by the aerodynamic design of the first and second flow paths "f1", "f2." (FIG. 3) Air within the first flow path "f1" passes across the filter membrane 50 which permits fugitive gases to diffuse therethrough and enter the gas sensing volume 58. The close positioning of the gas sensor 54 within the gas sensing volume 58 provides for rapid detection of fugitive gases. During operation, the thermal mass 64 functions as a heat sink transferring thermal energy from the gas sensor 54, and as a heat capacitor minimizing the temperature gradients across the gas sensor 54 thereby maintaining the functioning and accuracy of the gas sensor 54. In addition, the overall aerodynamic design of the flow paths "f1", "f2," the presence of the filter membrane 50 and the positioning of the thermal mass 64 in the enclosed interior 42 of the enclosure 16 negates any cooling effect that wind velocity of the air may have on the gas sensor 54. The air flowing through the flow path "f2" will assist in cooling the enclosure 16.

Figure 7:
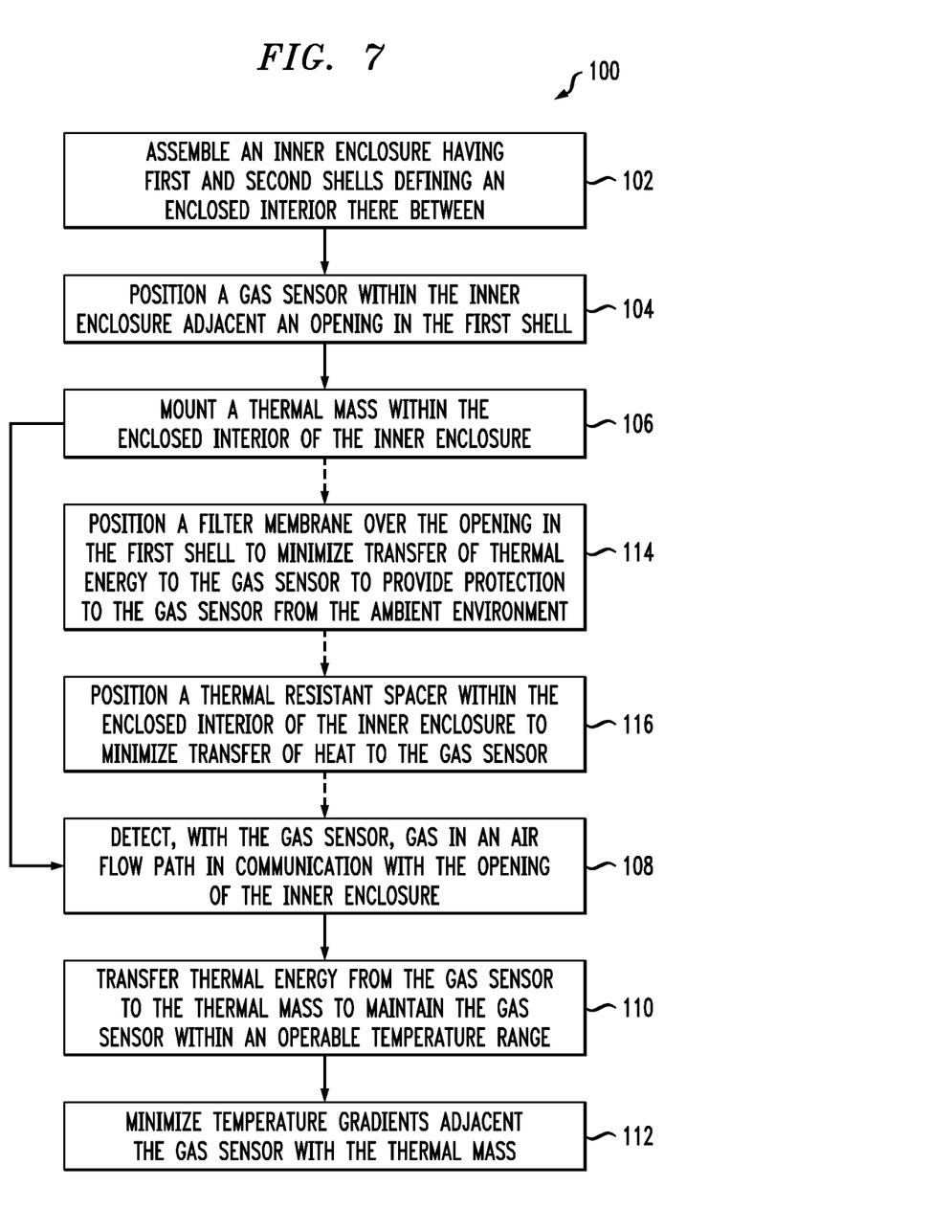
FIG. 7 is a flow chart depicting a methodology for detecting gases utilizing the sensor housing apparatus according to one or more embodiments of the present invention.

FIG. 7 illustrates a method of use of the sensor housing apparatus 10 in detecting gas. The method 100 includes the steps of assembling an enclosure 16 having first and second shells 28, 30 defining an enclosed interior 42 therebetween (STEP 102), positioning a gas sensor 54 within the enclosure 16 adjacent an opening 46 in the first shell 28 (STEP 104), mounting a thermal mass 64 within the enclosed interior 42 of the enclosure 16 (STEP 106), detecting, with the gas sensor 54, gas in an air flow path "f1" in communication with the opening 46 in the first shell 28 of the enclosure 16 (STEP 108), transferring thermal energy from the gas sensor 54 to the thermal mass 64 to maintain the gas sensor 54 within an operable temperature range (STEP 110), and minimizing temperature gradients adjacent the gas sensor 54 with the thermal mass 64 (STEP 112). The method may further include the steps of positioning a filter membrane 50 over the opening 46 in the first shell to minimize transfer of thermal energy to the gas sensor 54 and providing protection to the gas sensor 54 from the ambient environment (STEP 114) and positioning a thermally resistant spacer 52 within the enclosed interior 42 of the enclosure 16 to minimize transfer of heat to the gas sensor 54 (STEP 116). The method may include additional steps in accordance with the description of the gas sensor apparatus 10 detailed hereinabove.

Figure 8:
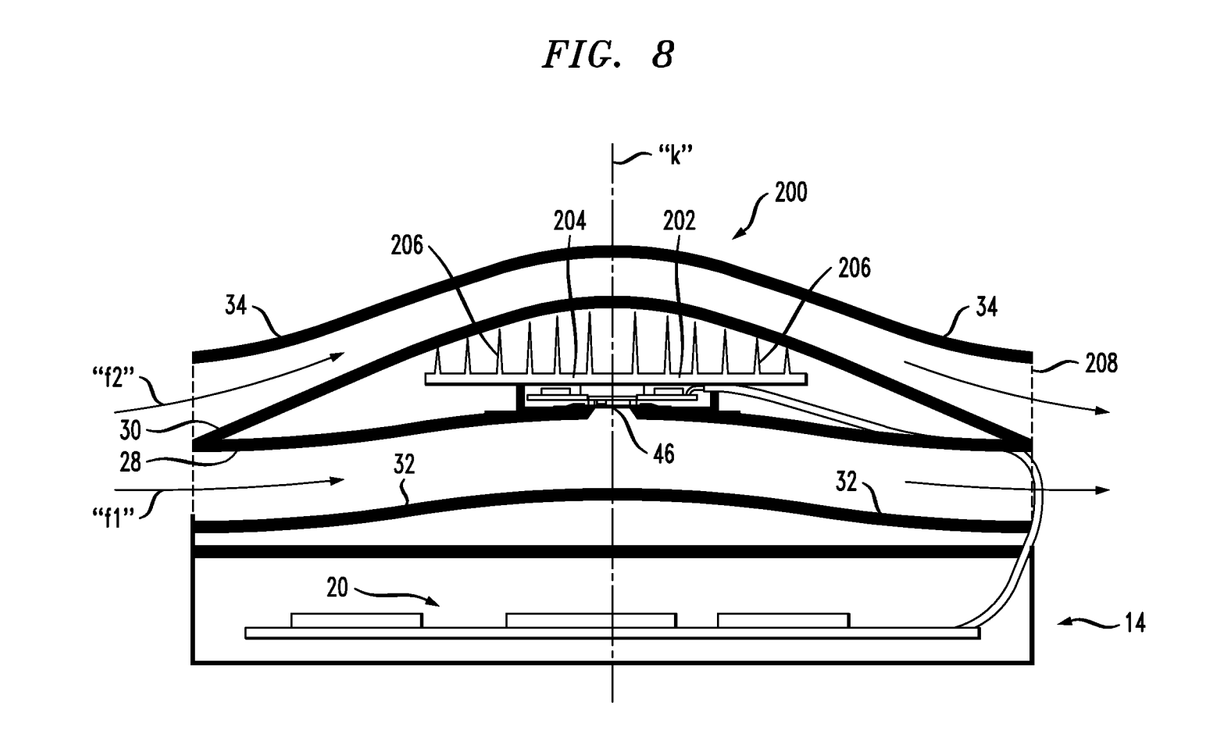
FIG. 8 is a schematic view of an alternate embodiment of the sensor housing apparatus illustrating the base, the outer assembly and the enclosure.
Figure 9:
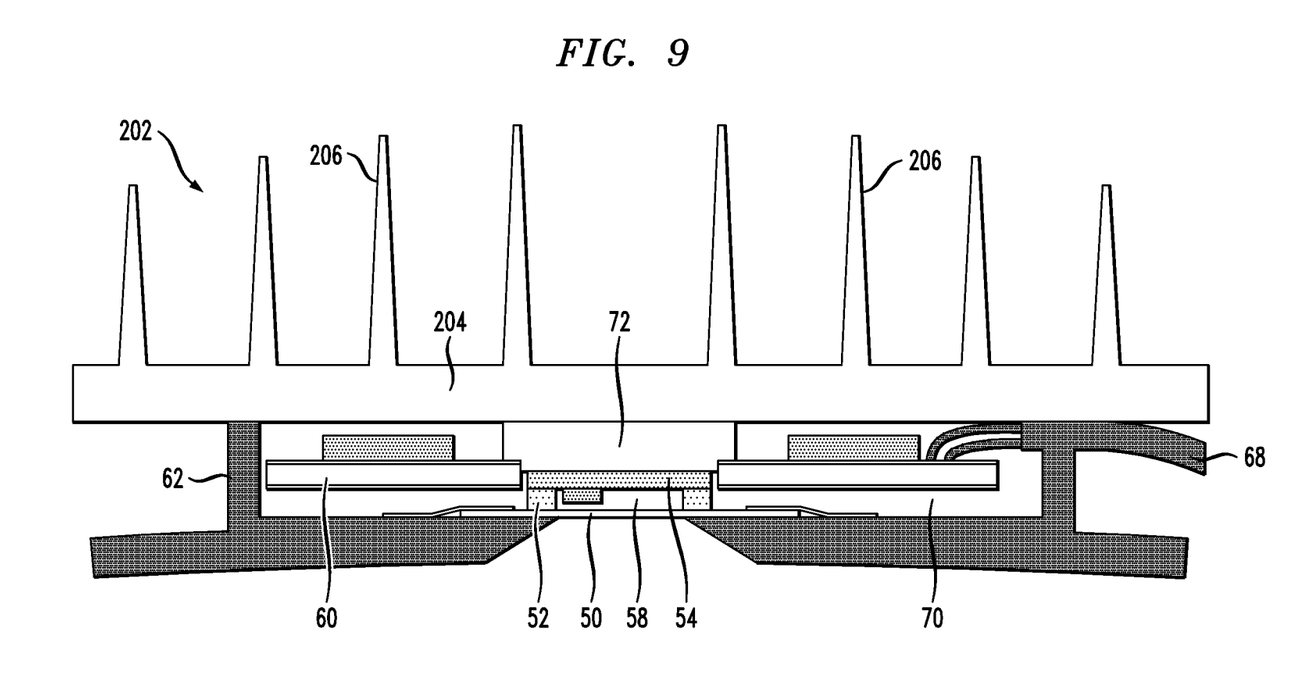
FIG. 9 is a schematic view illustrating the thermal mass, gas sensor and filter membrane of the enclosure of the sensor housing apparatus of FIG. 8.

FIGS. 8-9 illustrate one exemplary alternate embodiment of the sensor housing apparatus of the present invention. This sensor housing apparatus 200 incorporates a thermal mass 202 having a base 204 and a plurality of fins 206 depending upwardly from the base 204. The thermal mass 202 incorporating the fins 206 provides an alternate methodology to control, e.g., decrease the overall thermal resistance $R_T$ of the enclosure 16. A screen 208 may extend from the base 14 to the upper shell 34 to prevent entry of animals, waste etc. within the housing 12. It is noted that the screen 208 may be incorporated within the embodiment of FIGS. 1-7. In other respects, this embodiment is similar to the embodiment described in connection with FIGS. 1-7.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

For example, embodiments of the present invention may include a processor and software to perform multiple tasks, including, but, not limited to, digitizing analog signals of the gas sensor 54, calibrating and monitoring the operating condition of the gas sensor 54, controlling and fine tuning the frequency of the laser component of optics of the gas sensor 54, monitoring additional sensors which may be associated with the gas sensor 54, such as temperature, wind speed, and location, e.g., via use of GPS technology, compressing the gas-sensor data by identifying peaks of the sensed gas, and reporting only the peaks and a few attributes of each peak (peak magnitude, peak width, time of peak, temperature during the peak, wind speed and wind direction during the peak, monitoring and establishing a communication channel (typically a wireless channel) either through WIFI or cell phone communication, and transmitting data via the communication channel to a server or a cloud service.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
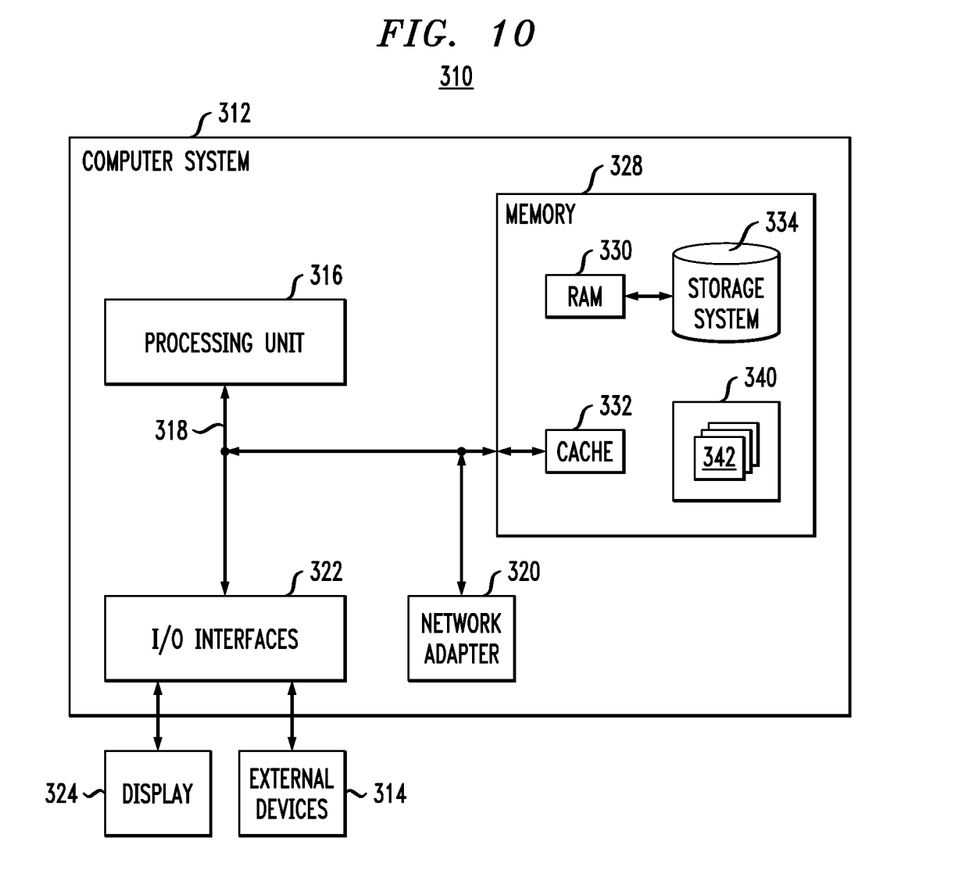
FIG. 10 depicts a computer system in accordance with which one or more components/steps of techniques described hereinbelow may be implemented according to one or more embodiments of the present invention.

One or more embodiments can make use of software running on a general-purpose computer or workstation. With reference to FIG. 10, in a computing node 310 there is a computer system/server 312, which is operational with numerous other general purposes or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 312 typically includes a variety of computer system readable media. Such media may be any available media that is accessible by computer system/server 312, and it includes both volatile and non-volatile media, removable and non-removable media.

The system memory 328 can include computer system readable media in the form of volatile memory, such as random access memory (RAM) 330 and/or cache memory 332. The computer system/server 312 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As depicted and described herein, the memory 328 may include at least one program product having a set (e.g., at least one) of program modules that are configured to carry out the functions of embodiments of the application. A program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the application as described herein.

Computer system/server 312 may also communicate with one or more external devices 314 such as a keyboard, a pointing device, a display 324, etc., one or more devices that enable a user to interact with computer system/server 312, and/or any devices (e.g., network card, modem, etc.) that enable computer system/server 312 to communicate with one or more other computing devices. Such communication can occur via I/O interfaces 322. Still yet, computer system/server 312 can communicate with one or more networks such as a LAN, a general WAN, and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
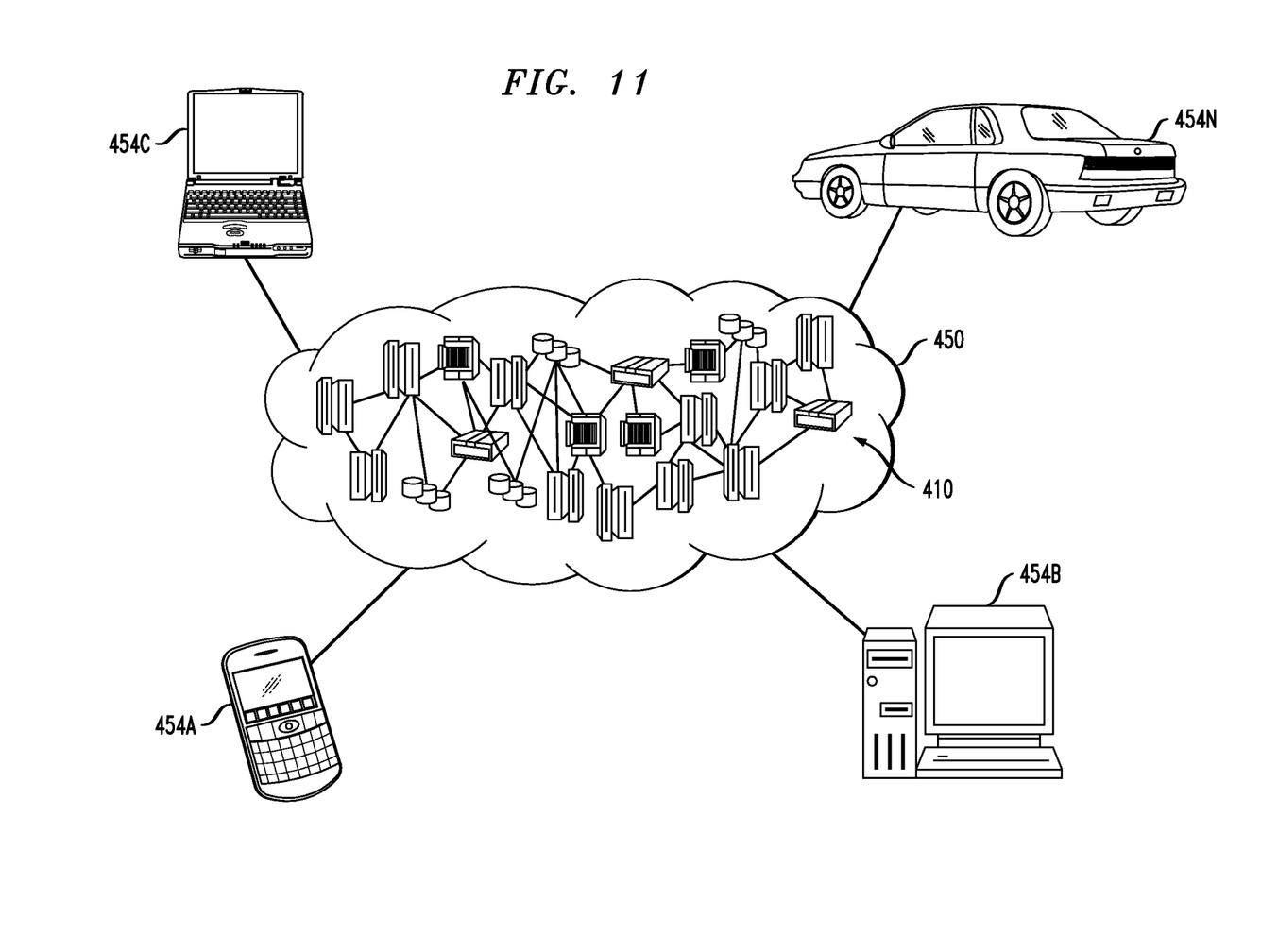
FIG. 11 depicts a cloud computing environment according to one or more embodiments of the present invention.

Referring now to FIG. 11, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 11 are intended to be illustrative only and that computing nodes 410 and cloud computing environment 450 can communicate with any type of computerized device over any type of network and/or network addressable connection (e.g., using a web browser).

Figure 12:
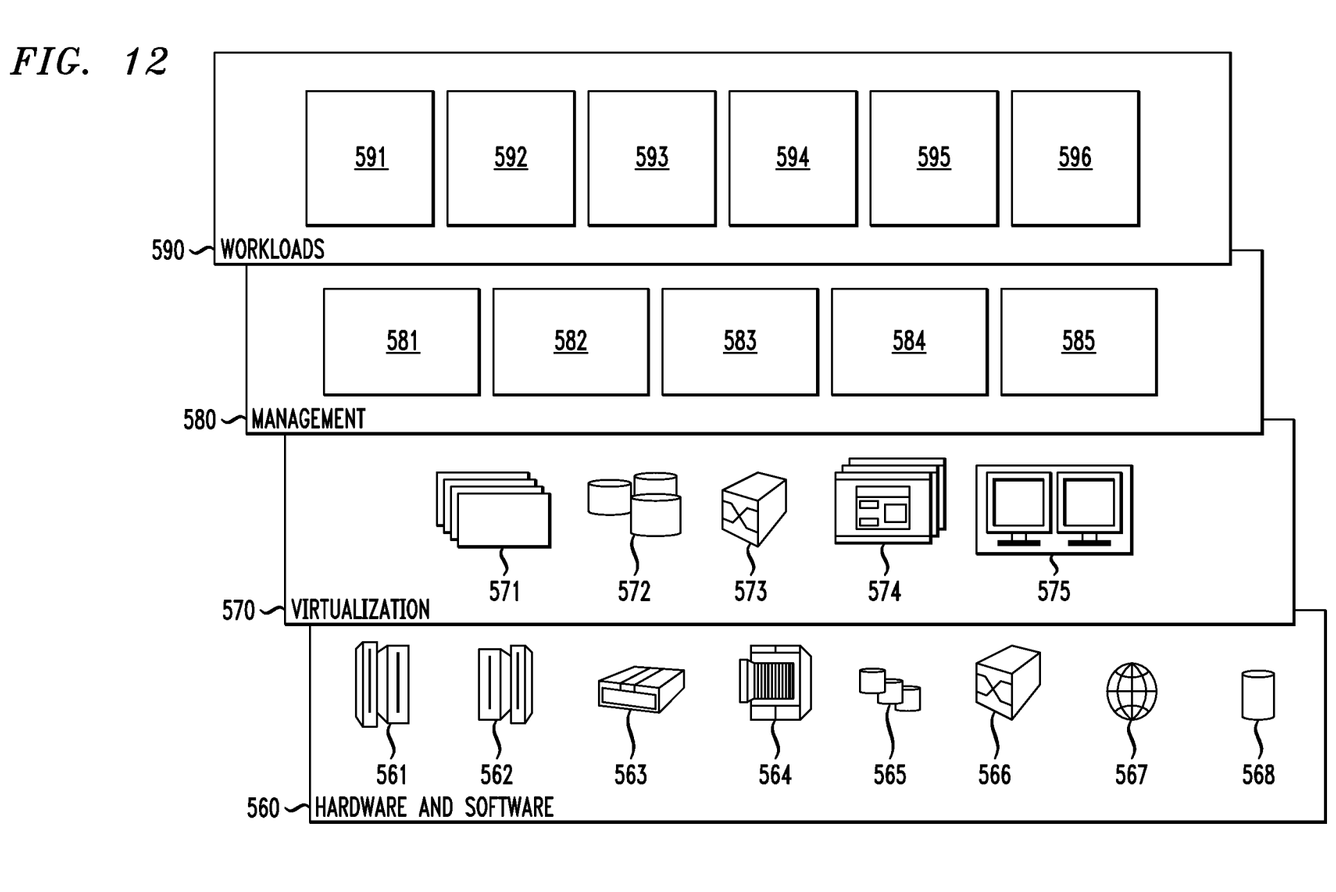
FIG. 12 depicts abstraction model layers according to according to one or more embodiments of the present invention.

Referring now to FIG. 12, a set of functional abstraction layers provided by cloud computing environment 450 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and sensing fugitive gas 596, which may perform various functions described above with respect to detecting fugitive gases using the gas sensor apparatus 10, methodologies and techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical invention or technical improvement over technologies found in the marketplace, or to enable others of ordinary skill in the art to understand the embodiments disclosed herein.

What is claimed is:

1. A sensor housing apparatus, comprising:
a housing defining at least one flow path configured to permit passage of fluid;
a gas sensor mounted to the housing, the gas sensor in fluid communication with the at least one flow path, the gas sensor configured to detect a presence of gas in the fluid passing along the at least one flow path; and
a thermal mass configured to perform at least one of: transfer thermal energy relative to the gas sensor; and minimize a temperature gradient adjacent the gas sensor.

2. The sensor housing apparatus of claim 1 wherein the housing includes a first housing component and a second housing component, the first and second housing components configured to define at least a portion of the at least one flow path.

3. The sensor housing apparatus of claim 2 wherein the first housing component and the second housing component are arranged in spaced relation to at least partially define the at least one flow path.

4. The sensor housing apparatus of claim 1 wherein the housing defines first and second flow paths configured to permit passage of fluids.

5. The sensor housing apparatus of claim 4 wherein the first flow path is in fluid communication with the gas sensor.

6. The sensor housing apparatus of claim 5 wherein the second flow path is isolated from the gas sensor.

7. The sensor housing apparatus of claim 6 wherein the housing includes an inner housing component and an outer housing component.

8. The sensor housing apparatus of claim 7 wherein the gas sensor is mounted within the inner housing component, the inner housing component defining an opening to enable fluid communication with the first flow path.

9. The sensor housing apparatus of claim 8 wherein the outer housing component includes first and second outer shells, the first outer shell and the inner housing component defining the first fluid path, the second outer shell and the inner housing component defining the second flow path.

10. The sensor housing apparatus of claim 8 including a filter membrane positioned adjacent the opening in the inner housing component.

11. The sensor housing apparatus of claim 1 wherein the thermal mass is supported in the housing, the thermal mass configured to transfer thermal energy from the gas source to an ambient environment surrounding the housing.

12. The sensor housing apparatus of claim 1 wherein the thermal mass includes a base and a plurality of fins depending upwardly from the base.

13. The sensor housing apparatus of claim 1 wherein the housing includes circuitry, the circuitry controlling operation of the gas sensor.

14. A sensor housing apparatus, comprising:
a housing defining at least one flow path configured to permit passage of fluid;
a gas sensor mounted to the housing, the gas sensor in fluid communication with the at least one flow path, the gas sensor configured to detect a presence of gas in the fluid passing along the at least one flow path; and
a thermal mass mounted to the housing in thermal communication with the gas sensor, the thermal mass configured to establish an overall thermal resistance RT with an ambient environment less than 30° C./W and a thermal time constant τ greater than 100 seconds.

15. The sensor housing apparatus of claim 14 wherein the housing defines first and second flow paths configured to permit passage of fluids.

16. The sensor housing apparatus of claim 14 including a filter membrane in fluid communication with the gas sensor and the at least one flow path.

17. A method for detecting gas, comprising:
positioning a housing at a location to detect a presence of gas, the housing defining at least one flow path for passage of fluids, and a gas sensor in fluid communication with the at least one flow path;
detecting, with the gas sensor, gas in the at least one flow path of the housing; and
transferring thermal energy from the gas sensor to a thermal mass mounted to the housing.

18. The method of claim 17 wherein the housing defines a second flow path, the second flow path configured and positioned to convey thermal energy from the thermal mass to an ambient environment.

19. The method of claim 18 including filtering the fluids with a filter membrane positioned adjacent the gas sensor.

20. The method of claim 17 wherein the gas sensor is an optical sensor.

* * * * *